US012252990B2

(12) United States Patent
Knob

(10) Patent No.: US 12,252,990 B2
(45) Date of Patent: Mar. 18, 2025

(54) ROTARY COMBUSTION ENGINE BLOCK SEALING

(71) Applicant: Vaclav Knob, Prague (CZ)

(72) Inventor: Vaclav Knob, Prague (CZ)

( * ) Notice: Subject to any disclaimer, the term of this patent is extended or adjusted under 35 U.S.C. 154(b) by 69 days.

(21) Appl. No.: 18/110,764

(22) Filed: Feb. 16, 2023

(65) Prior Publication Data

US 2023/0250722 A1 Aug. 10, 2023

(51) Int. Cl.

| | |
|---|---|
| ***F01C 19/02*** | (2006.01) |
| ***F01C 19/00*** | (2006.01) |
| ***F01C 19/08*** | (2006.01) |
| ***F01C 19/10*** | (2006.01) |
| ***F02F 11/00*** | (2006.01) |

(52) U.S. Cl.

CPC ............ *F01C 19/02* (2013.01); *F01C 19/005* (2013.01); *F01C 19/08* (2013.01); *F01C 19/10* (2013.01); *F02F 11/007* (2013.01)

(58) Field of Classification Search

CPC ........ F01C 19/02; F01C 19/005; F01C 19/08; F01C 19/10; F02F 11/007

See application file for complete search history.

(56) References Cited

U.S. PATENT DOCUMENTS

| | | | | |
|---|---|---|---|---|
| 3,981,642 A * | 9/1976 | Kawamura | F01C 19/08 418/91 |
| 4,058,321 A * | 11/1977 | Gavrun | F01C 19/08 277/357 |
| 6,928,965 B2 * | 8/2005 | Teufl | F01B 13/045 123/18 R |
| 9,322,274 B2 * | 4/2016 | Knob | F01C 19/02 |
| 9,366,200 B2 * | 6/2016 | Knob | F02F 11/007 |

FOREIGN PATENT DOCUMENTS

| | | | |
|---|---|---|---|
| FR | 2767156 A1 * | 2/1999 | F01B 13/068 |

* cited by examiner

*Primary Examiner* — Mary A Davis
(74) *Attorney, Agent, or Firm* — Krishna Kalidindi

(57) ABSTRACT

A block sealing of a rotary combustion engine having a rotating block with radially located cylinders and pistons and an outside stationary case is disclosed. Transverse and/or lateral sealings located in the stationary case fit tight to an outer surface of the block. In circular grooves, a lateral sealing of radius sealing strips with springs situated between adjacent transverse sealing strips placed in transverse grooves is located. Couplings with notches and pressure springs are located in bores of the stationary case for inserting radius sealing strips and transverse sealing strips. The radius sealing strip is provided with a cut-out for interlocking of a stop connected with the stationary case. In the side of the radius sealing strip, a longitudinal groove in which a flexible sealing element and/or transverse sealing strip is made, and at its side, it is provided with a groove in which another flexible sealing element is located.

11 Claims, 6 Drawing Sheets

ROTARY COMBUSTION ENGINE BLOCK SEALING

CROSS REFERENCE TO PRIOR APPLICATION(S)

This application claims priority to Czech Republic Patent Application No. CA-PV 2022-515 filed on Dec. 9, 2022, the subject matter of which is incorporated in its entirety herein by reference.

TECHNICAL FIELD

The disclosure relates to a rotary combustion engine block sealing that comprises a rotating block of a rotational shape, with radially situated cylinders with pistons. Outside the rotating cylinder block there is a stationary case with at least one intake and/or exhaust port. The rotating cylinder block together with the stationary case work like a rotary valve.

BACKGROUND

There have been designed many engines with a rotating block of a rotational shape with radially situated cylinders with pistons and an outer stationary case with an intake and/or exhaust port. The rotating cylinder block together with the stationary case work like a rotary valve. There are well known designs of two-stroke as well as four-stroke engines, two, three and multi-cylinder arrangements. Some engines have been equipped with the crankshaft mechanism and some have been equipped with other known mechanisms for transferring the motion of the piston to the shaft. None of those designs has achieved wider enlargement and utilization despite the undoubted potential.

There are many reasons why these engines were not successful. The main reason is that the seal between the rotating block and the stationary case was not optimally designed. Mostly, the seal between cylinder space and the stationary case was done by means of sealing elements that were placed in the rotating cylinder block. Those sealing elements were then exposed to centrifugal forces that result from rotation of the rotating block. Together with increasing revolutions that leads to significant stress of these sealing elements, to high friction losses and lubrication problems. Such designs are described e.g. in documents DE 2732779, FR2767156A1.

There have been also designs with a seal that is placed in the stationary case of the engine. The most simple is a seal in the form of rings that are placed on both sides of the perimeter of the rotating block. Another seal is done by transverse sealing strips that are placed in the stationary case in the transverse direction with respect to the motion of the perimeter of the rotating block. Such designs are described e.g. in documents FR2639676A1, U.S. Pat. No. 1,705,130A, WO9823850A1, WO8302642A1, etc.

The most perfect execution of the sealing located in the stationary engine case yet is the solution according to patents CZ304371, US 936620062. This solution has the advantage of eliminating the centrifugal forces applied to sealing elements. The sealing set comprises many elements, and the interstices between them are a source of leaks. Another important source of leaks is represented by any minor deformation or inaccuracy of the sealing strip and its groove in the mutual contact of strips and grooves. Then, there is a blow-through provided by the leak around the sealing strip, which is significantly higher than the blow-through in the contact surface of the strip with the surface of the rotating block. In this contact surface, the operation results in running-in and the blow-through is thus minimal.

Another issue to be solved is the affect of friction forces to the lateral radius sealing strips. Especially with longer radius sealing strips, the problem lies in the fact that the radius sealing strip is driven by a frictional force, which effects the transverse sealing strip in the coupling of radius and transverse strips. The resultant F of frictional forces is divided into two force components F1 and F2 due to acting on the transverse sealing strip. The F1 force acts perpendicular to the transverse strip and this load results in increasing the resistance for the radial movement of the transverse strip in the groove. This worsens the tightness of the whole strip and coupling set.

Another adverse effect is caused by the force component F2, which pushes the radius sealing strip away from the contact surface with the rotating block. This further decreases the tightness between the rotating block and the stationary engine case. When lubricating the sealing by a mixture of oil in the fuel, it is quite difficult to maintain the oil film on the contact surface of radius sealing strips with the outer surface of the rotating block.

SUMMARY

Above mentioned deficiencies are removed to a large extent by the rotary combustion engine block sealing according to example embodiments. The rotary combustion engine comprising a rotating block of a rotational shape with radially situated cylinders with pistons and an outer stationary case with at least one intake port and/or exhaust port. The outer surface of the rotating block is a rotational surface with a straight-line profile curve or a curved line profile curve, on which the transverse and/or side seals, which are placed in the stationary case, are seated.

The circular grooves there is a side seal that consists of radius sealing strips with springs that are located between neighbouring transverse sealing strips that are placed in transverse grooves. Those transverse sealing strips go through the circulars grooves across. In the place where the radius sealing strips and transverse sealing strips meet there are joints with notches for inserting the radius sealing strips and transverse sealing strips. Those joints are placed in bores in the outer stationary case and comprise pressure springs. According to example embodiments, the radius sealing strip is provided with a cut-out for fitting the stop connected to the stationary case, and a radius groove is formed in the side of the radius sealing strip, in which a flexible sealing element is placed and/or the transverse sealing strip is provided with a groove on the side. in which another flexible sealing element is placed.

The radius sealing strip and the transverse sealing strip may be located in the notches of a coupling, which on its side has an outer groove in which a coupling flexible sealing element is located and/or an internal groove for another coupling flexible sealing elements is present in the notch.

Between transverse sealing strips, in the transverse groove for example, short radius strips having a short longitudinal groove, where a short flexible sealing element is, are located.

The radius sealing strip may have a side-corrugated contact sealing seating surface.

Flexible sealing elements, short flexible sealing elements, other flexible sealing elements, coupling flexible sealing elements and other coupling sealing elements may have O-shaped and/or X-shaped cross-sections Rotary combustion engine block sealing enables effective sealing between the rotating block and the stationary case. Placement of the sealing elements in the stationary case ensures that the pressure force of the sealing elements is independent on the engine speed and that allows reaching high engine speed and thus high specific parameters. All transverse sealing strips and radius sealing strips have surface contact with the rotating outer surface of the rotating block.

The radius sealing strip may be provided with a cut-out which leans against the stop in the stationary case. This improves the function of the sealing set since it significantly eliminates the unfavourable effect of the friction forces to the radius sealing strip and the transverse strip as well as the coupling. The high lateral load of the transverse strip and the pushing the radius strip away from the contact surface with the rotating block are eliminated.

The resultant of the frictional forces F is transferred to this stop. If the reaction force R does not act directly against F, also the reaction moment Mr will act on the strip, but this reaction moment will be very low. However, the short radius strip does not need the stop, since its force action on the transverse strip is low. A significant improvement in tightness is provided by flexible sealing elements in lateral grooves in all sealing strips and the coupling. For their production, e.g. fluoro-elastomers (FPM, FKM) can be used. Their cross-section (i.e. of the sealing elements) can be circular, X-shaped or similar. These elements can be placed on the opposite side of the sealing strip from the higher pressures that it is supposed to seal.

Then, the gas pressure penetrating to the groove will increase the down-pressure of the sealing strip to the block being sealed. Since the stationary case can be effectively cooled with liquid, the temperature in the sealing strip grooves will be favourable, and flexible sealing elements will not be excessively heat stressed. If strips are lubricated with oil admixture to fuel, it is suitable to form a side-corrugated sealing seating surface being in contact with the rotating block on radius sealing strips. This way, the lubricant accesses the contact surface more easily.

BRIEF DESCRIPTION OF THE DRAWINGS

Rotary combustion engine block sealing according to example embodiments may be understood with reference to the enclosed drawings, wherein.

DETAILED DESCRIPTION

Figure 1:
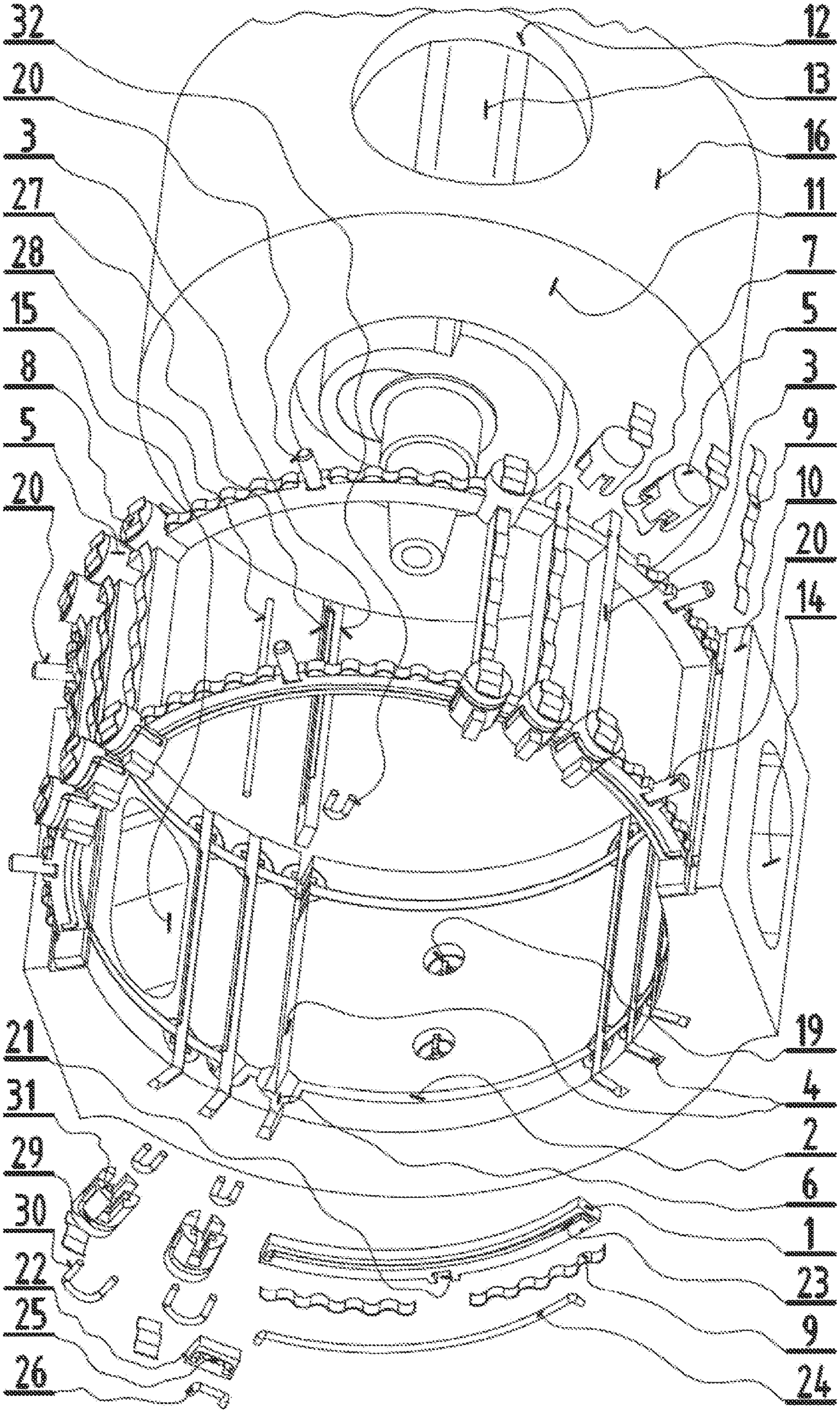
FIG. 1 illustrates an axonometric view of the seal assembly with a half of the stationary case and the rotating block with cylinders and pistons. The cylinder block with pistons is axially moved from the outer stationary case for better illustration.
Figure 2:
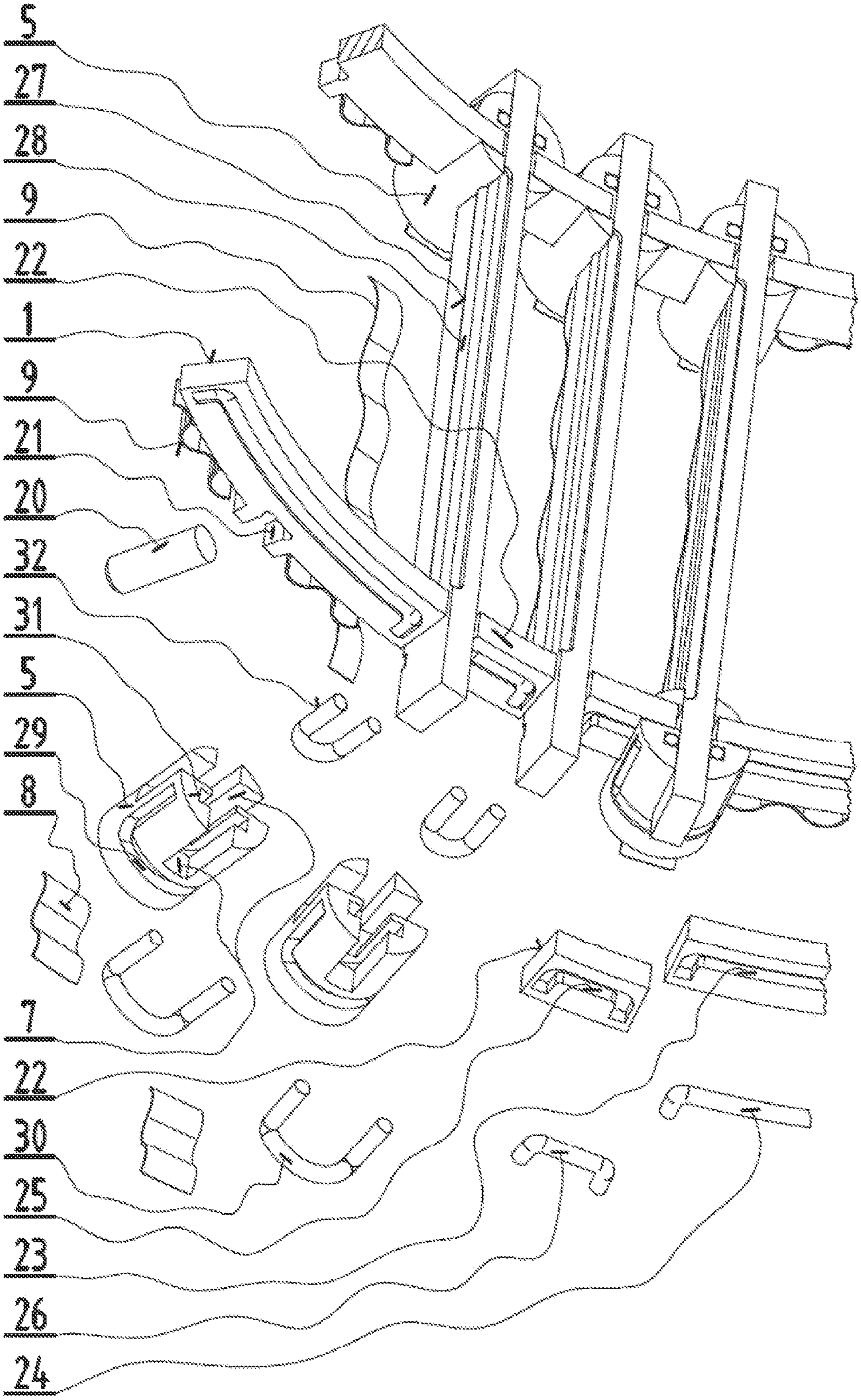
FIG. 2 illustrates sealing elements, including grooves and flexible sealing elements in an axonometric view with partial breakdown of the set.
Figure 3:
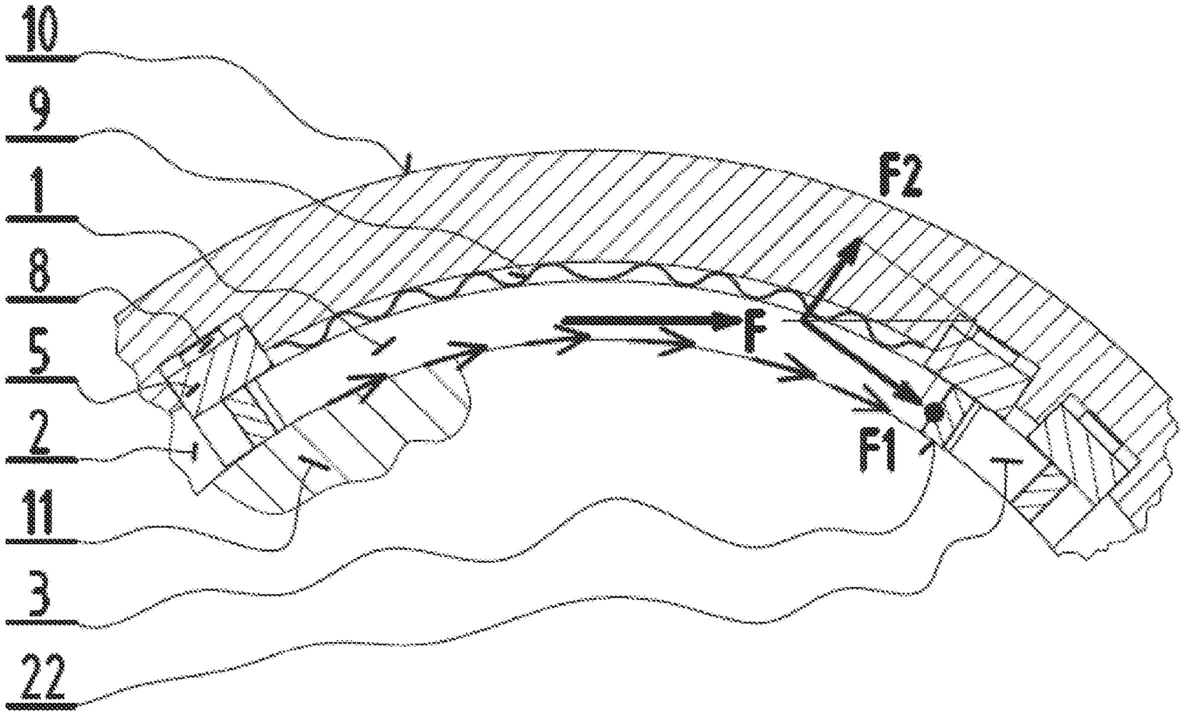
FIG. 3 illustrates a partial section of a rotary piston engine perpendicular to the axis of rotation, where the radius sealing strip and the transverse sealing strip and respective force ratios in the variant without a stop in the stationary case and without a cut-out in the radius sealing strip are depicted.
Figure 4:
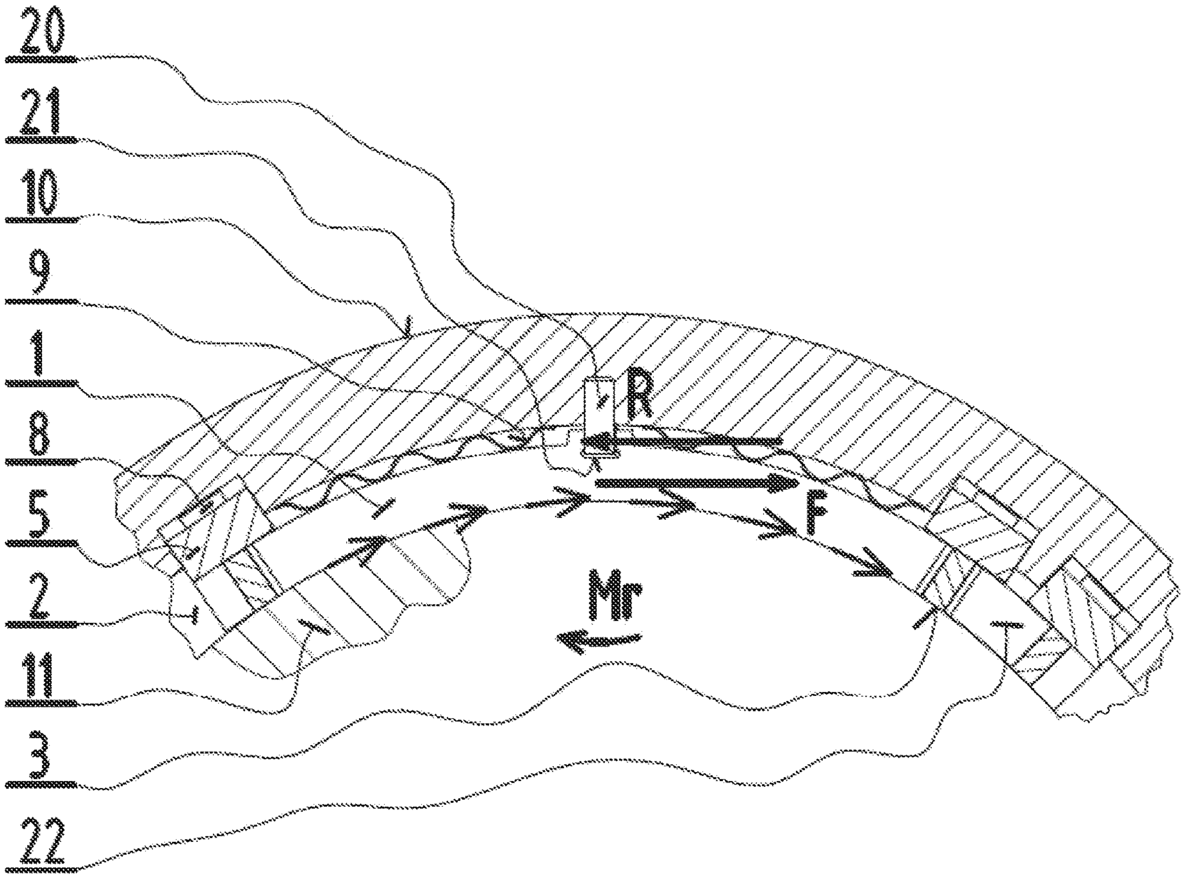
FIG. 4 illustrates a partial section of a rotary piston engine perpendicular to the axis of rotation, where the radius sealing strip with a cut-out for a stop, the stop in the stationary case and the transverse sealing strip are depicted. Also respective force ratios are shown.

An example sealing of a rotary combustion engine block sealing according to FIG. 1 is formed by radius sealing strips 1, short radius strips 22, transverse sealing strips 3, couplings 5, pressure springs 8 and springs 9. All these elements are located in a stationary case 10, where a rotating block 11 with radially located cylinders 12, in which pistons 13 move, is located. Its outer surface 16 is made by a rotary cylinder surface. The stationary case 10 is provided with an intake port 14 and an exhaust port 15. Couplings 5 are provided with notches 7, into which radius sealing strips 1 and transverse sealing strips 3 interlock.

The radius sealing strips 1 have a cut-out 21 on their outer side, into which a stop 20 located in the stationary case 10 interlocks. The radius sealing strips 1 have a longitudinal groove 23 on their side, where a flexible sealing element 24 is located, and short radius strips 22 have a short longitudinal groove 25 on their side, where a short sealing element 26 is present, and the radius sealing strip 1 and the short radius strip 22 are located in circular grooves 2.

Pressure springs 8 and couplings 5 are located in bores 6. The couplings 5 have an outer groove 29 on their side, where a coupling flexible sealing element 30 is located, and an internal groove 31 for another coupling flexible sealing element 32 is made in the notch 7. In the transverse sealing strip 3, a groove 27 for the other flexible sealing elements 28 is provided on the side. The transverse sealing strips 3 are located in transverse grooves 4, and springs 9 are located in transverse grooves 4 and circular grooves 2. Between the spark plug 19 and the intake port 14 and the exhaust port 15, three transverse sealing strips 3 are located.

Figure 5:
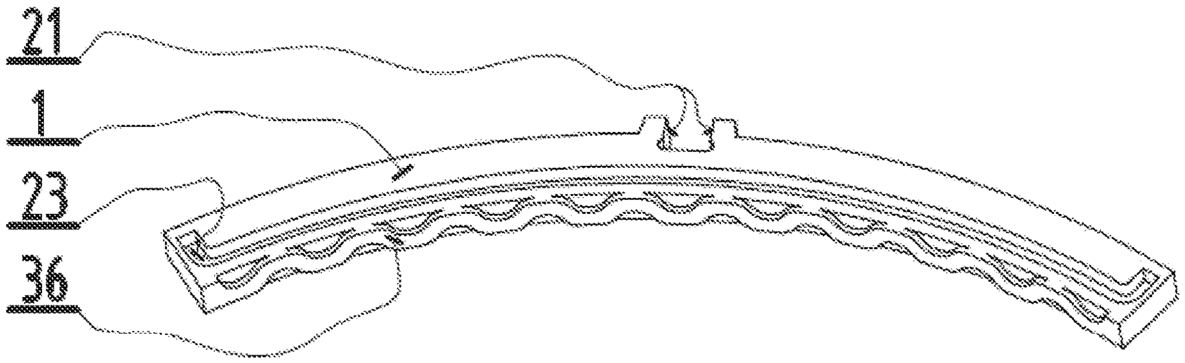
FIG. 5 illustrates the radius sealing strip with a side-corrugated sealing seating surface in an axonometric view.

The embodiment of the rotary combustion engine block sealing according to FIG. 5 is based on the embodiment according to FIG. 1. The difference is in the use of the radius sealing strip 1 provided with a sealing seating surface 36, which is side-corrugated.

Figure 6:
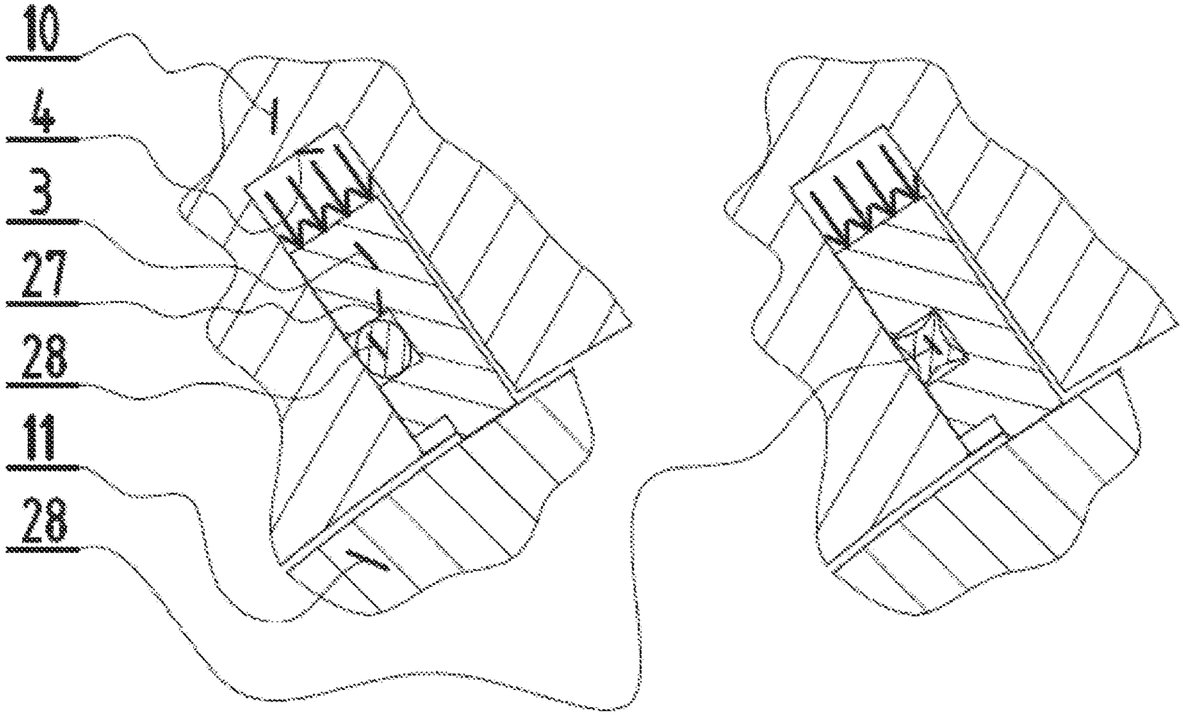
FIG. 6 illustrate a partial section of a rotary piston engine perpendicular to the axis of rotation, where a section of a transverse sealing strip with a groove and a flexible sealing element with an O-shaped and an X-shaped section variants of these elements is shown.

The embodiment of the rotary combustion engine block sealing according to FIG. 6 is based on the embodiment according to FIG. 1. The transverse sealing strips 3 have another flexible sealing element 28 having a circular section and an X-shaped sections in the groove 27.

The operation of the rotary combustion engine block sealing is as follows. The radius sealing strips 1 and transverse sealing strips 3 are down-pressed to the outer surface 16 of the rotary block 11 by springs 9. The pressure springs 8 down-press the couplings 5 to the outer surface 16 of the rotary block 11. The gas blow-throughs in the circular groove 2 around the radius sealing strip 1 are prevented by the flexible sealing element 24 in the longitudinal groove 23.

Also in the transverse groove 4, the other flexible sealing element 28 in the groove 27 prevents the blow-throughs around the transverse sealing strip 3. The flexible sealing element 24 and the other flexible sealing element 28 are located on the sides of strips more distant from the area with a higher gas pressure. Then the gas penetrating into the longitudinal groove 24 and the groove 27 increases the down-pressure of the radius sealing strip 1 and the transverse sealing strip 3 to the outer surface 16 of the rotary block 11.

The radius sealing strip 1 is provided with a cut-out 21 which leans against the stop 20 in the stationary case 10. Into this groove 20, the resultant F of friction forces is transferred between the radius sealing strip 1 and the rotary block 11, and causes the reaction R with a low reaction moment Mr. Due to the stop 20, the friction forces are not transferred to the transverse sealing strip 3, and do not decrease its sealing properties and the sealing function of the radius strip 1.

The flexible sealing element 24 and the other flexible sealing element 28 interlock into the notches 7 in the coupling 5. This improves the tightness in these connections. The coupling 5 is provided with the outer groove 29 with the coupling flexible sealing element 30, which decreases the gas blow-through around the coupling 5. The coupling flexible sealing element 30 is at the side of the coupling 5 away from the place of higher pressure. It does not prevent the penetration of pressure under the coupling, but prevents the gas from escaping further into the lower pressure area. In the notch 7 of the coupling 5, an inner groove 31 with another coupling flexible sealing element 32 preventing the blow-through around the transverse sealing strip 3 passing through the coupling 5 is present.

The cross-section of flexible sealing elements can, for example, be circular or X-shaped. For better oil access between the radius sealing strip 1 and the outer surface 16 of the rotating block 11, it is preferred to use the contact sealing seating surface 36, which is side-corrugated.

INDUSTRIAL APPLICABILITY

The rotary combustion engine block sealing according to the disclosure can be used, for example, in aircraft engines, motor generators for the production of electricity, motorcycle engines and in other applications of rotary piston engines, where high performance with low weight and engine dimensions is of primary importance. The rotary piston engine can be used for combustion gaseous fuels, including combustion of hydrogen due to their favourable design with absence of particularly hot valves. If the consumption of lubrication oil can be minimized, it can be used in cars as well. For example, as a range extender in electric cars.

What is claimed is:

1. A rotary combustion engine block sealing comprising:

a rotating block having a rotary shape with radially located cylinders with pistons; and an outside-located stationary case with at least one intake port and/or an exhaust port, wherein an outer surface of the rotating block is formed by a rotating surface with a straight or curved forming curve, a transverse sealing and a lateral sealing are seated on the rotating block;

the transverse sealing and the lateral sealing are located in the stationary case, wherein the lateral sealing comprising of radius sealing strips with springs placed between adjacent transverse sealing strips is located;

the transverse sealing strips are located in transverse grooves, and the transverse sealing strips pass across circular grooves, wherein couplings are provided with notches for inserting the radius sealing strips, the couplings connecting the radius sealing strips with the transverse sealing strips; and the couplings are seated in bores in the stationary case and the couplings are provided with pressure springs, wherein the radius sealing strips are provided with a cut-out for interlocking of a stop connected with the stationary case, and a longitudinal groove is formed in a side of the radius sealing strips, and at least one flexible sealing element is present in the longitudinal groove, and/or the transverse sealing strips are provided with a groove on a side, where another flexible sealing element is located.

2. The rotary combustion engine block sealing according to claim 1, wherein the radius sealing strips and the transverse sealing strips are located in the notches of the coupling, on a side of the coupling is an outer groove in which a coupling flexible sealing element is located and/or an internal groove for another coupling flexible sealing element is present in the notches.

3. The sealing according to claim 2, wherein the coupling flexible sealing elements and the another coupling flexible sealing elements have O-shaped shaped cross-sections and interlock into the notches.

4. The sealing according to claim 2, wherein the coupling flexible sealing elements and the another coupling flexible sealing element have X-shaped cross-sections.

5. The rotary combustion engine block sealing according to claim 1, wherein short radius strips having a short longitudinal groove are located between the transverse sealing strips in the transverse grooves and a short flexible sealing element is located in the short longitudinal grooves.

6. The sealing according to claim 5, wherein the coupling flexible sealing elements and the another coupling flexible sealing element interlock into the notches.

7. The sealing according to claim 5, wherein the short flexible sealing elements have O-shaped cross sections.

8. The sealing according to claim 5, wherein the short flexible sealing elements have X-shaped cross-sections.

9. The sealing according to claim 1, wherein the radius sealing strips have a contact sealing seating surface, which is side-corrugated.

10. The sealing according to claim 1, wherein the at least one flexible sealing element, and the another flexible sealing element have O-shaped cross-sections.

11. The sealing according to claim 1, wherein the flexible sealing elements and the other flexible sealing elements have X-shaped cross-sections.

* * * * *